(12) United States Patent
Price

(10) Patent No.: US 7,421,978 B2
(45) Date of Patent: Sep. 9, 2008

(54) PORTABLE WASHING APPARATUS FOR ANIMALS

(76) Inventor: Roger W. Price, 625 E. McAllister St., Lebanon, IL (US) 62254

( * ) Notice: Subject to any disclaimer, the term of this patent is extended or adjusted under 35 U.S.C. 154(b) by 328 days.

(21) Appl. No.: 11/252,312

(22) Filed: Oct. 17, 2005

(65) Prior Publication Data
US 2006/0102097 A1    May 18, 2006

Related U.S. Application Data

(60) Provisional application No. 60/662,921, filed on Mar. 18, 2005, provisional application No. 60/619,638, filed on Oct. 18, 2004.

(51) Int. Cl.
*A01K 13/00* (2006.01)
(52) U.S. Cl. .................... 119/671; 119/604
(58) Field of Classification Search ............. 119/671, 119/600, 601, 602, 603, 604, 667, 668, 669, 119/673, 678, 753, 755
See application file for complete search history.

(56) References Cited

U.S. PATENT DOCUMENTS

| 2,536,943 | A | * | 1/1951 | Kessel | 119/676 |
|---|---|---|---|---|---|
| 2,862,307 | A | * | 12/1958 | Bloomer et al. | 312/1 |
| 3,749,064 | A | * | 7/1973 | Weinstein et al. | 119/664 |
| 3,941,092 | A | * | 3/1976 | Winters | 119/497 |
| 4,020,796 | A | * | 5/1977 | Grifa | 119/671 |
| 4,057,032 | A | * | 11/1977 | Dimitriadis | 119/671 |
| 4,083,328 | A |   | 4/1978 | Baker |  |
| 4,382,424 | A | * | 5/1983 | Altissimo | 119/668 |
| 4,407,234 | A | * | 10/1983 | Kleman | 119/672 |
| 4,549,502 | A | * | 10/1985 | Namdari | 119/664 |
| 4,930,453 | A | * | 6/1990 | Laliberte | 119/671 |
| 5,193,487 | A | * | 3/1993 | Vogel | 119/671 |
| 5,243,931 | A | * | 9/1993 | McDonough | 119/671 |
| 5,259,339 | A | * | 11/1993 | McLaughlin | 119/676 |
| 5,279,257 | A |   | 1/1994 | Temby |  |
| 5,632,231 | A | * | 5/1997 | Moore | 119/671 |
| 5,678,511 | A |   | 10/1997 | Day |  |
| 5,722,349 | A |   | 3/1998 | Wolgamuth |  |
| 5,794,570 | A | * | 8/1998 | Foster et al. | 119/756 |
| 5,897,433 | A | * | 4/1999 | Kendrick | 452/105 |
| 6,435,136 | B1 |   | 8/2002 | Segura Munoz |  |
| 6,688,257 | B2 |   | 2/2004 | Lee |  |
| D493,259 | S |   | 7/2004 | Oroz |  |
| 7,040,254 | B1 | * | 5/2006 | Rucker et al. | 119/675 |
| 7,107,937 | B1 | * | 9/2006 | Anderson | 119/671 |

* cited by examiner

*Primary Examiner*—Yvonne R. Abbott
(74) *Attorney, Agent, or Firm*—Charles McCloskey

(57) ABSTRACT

The portable washing apparatus for animals has a base and an opposite lid that combine to form a container. The base has a floor and walls to store and to release water, and straps to secure temporarily a pet such as a dog. The lid fits upon the base and over a pet therein. The apparatus includes at least one pair of gloves that have a watertight connection to openings in the base and the lid. A sprayer system connected to the base allows an owner to direct water upon all parts of a pet. The lid and base contain wash water from a pet so the owner avoids a soaking and the pet can be washed indoors or outdoors.

7 Claims, 4 Drawing Sheets

PORTABLE WASHING APPARATUS FOR ANIMALS

CROSS-REFERENCE TO RELATED APPLICATIONS

This utility patent application claims the benefit and priority of provisional application Ser. No. 60/662,921, filed Mar. 18, 2005, and provisional application Ser. No. 60/619,638, filed Oct. 18, 2004 and both are commonly owned by the same inventor. The above noted applications are incorporated herein by reference.

BACKGROUND OF THE INVENTION

The portable washing apparatus for animals relates to bathing equipment in general and more specifically to a container suitable for pets, particularly dogs. As man's best friend, animals such as dogs do most everything with people. As people exert themselves, so do the dogs. As people walk through brush and mud, so do the dogs. When exerted or taken outdoors, dogs eventually acquire an odor, dirt, plant matter, and possibly fleas. Owners usually notice this when the dog is brought indoors or close to the owner. From time to time dogs require a bath.

Usually washing a pet, particularly a dog, is a lengthy process that completely drenches the pet, the owner, and the surrounding area which is often outdoors. Many people spend a spring or summer day with a pet in a wash tub covered in suds and a garden hose running. The pet can splash around in the tub which usually shares some of the wash water with the owners. The wash water cleanses and relaxes the pet. Pet owners get satisfaction from bonding with their pet during washing and have a clean pet to take back inside. However, outdoor washing of pets generally ceases in colder weather and pet owners then incur the higher expense of a visit to a groomer.

Wash tubs generally collect water from bathing a pet but leave the tub open on the top. The open top allows a pet to enter the tub and the owner to wash the pet by hand. However, the open top does not prevent splashes from reaching the owner. The open top of a wash tub generally encourage the outdoors, a patio, a deck, or a garage for a pet washing location.

A unique aspect of the present invention is a multiple piece container for a pet that includes plumbing and thus an owner avoids drenching himself and the surrounding area. With the present invention, a pet can be washed outdoors as before or even indoors with minimal risk of splashing.

DESCRIPTION OF THE PRIOR ART

Pet washing systems and devices in many forms are known in the prior art. The difficulty in providing a portable apparatus for washing animals is shown by a typical dog washing device. Early devices began with brushes and sponges generally used with soap and water. The brushes distributed the soap upon the fur and skin of an animal. Alas, the brushes also allowed soap and water to contact an owner performing the washing. Then owners placed animals into tubs for washing. Tubs contained the water and soap and allowed recycling of the wash water upon the animal. Alas, tubs permitted animals to splash and again drenched an owner. In time, the strength of soaps used upon animals encouraged owners to wash them from arms length and to develop alternate ways of washing animals.

The prior art has many instances of pet washing systems. For instance, the U.S. patent to Wolgamuth, U.S. Pat. No. 5,722,349, describes an ergonomic hand pet washing system. This invention is a pair of rubber gloves with hoses attached to the palm of each glove. An owner places his hands into the gloves and then washes the animal as before, generally without a container. This invention still leaves an owner at risk of drenching when an animal shakes off water.

The U.S. patent to Baker, Sandra, U.S. Pat. No. 4,083,328, shows a pet washing device. This invention has a rigid lower tub and a flexible upper bag. The bag has a zipper to insert an animal therein while the animal stands upon the interior of the lower tub. The lower tub has an outlet and hose for drainage. This invention may leak water from the bag and tub junction but still has openings for gloves. This invention lacks plumbing to distribute water upon the animal.

The U.S. patent to Temby, U.S. Pat. No. 5,279,257, illustrates another pet washing apparatus. Improving on the Baker patent, this patent has an upper casing bonded to a rigid tub. The flexible upper casing admits and covers an animal for washing using the two holes. However, this patented invention lacks plumbing for distributing water upon the animal therein.

Then the U.S. patent to Day, U.S. Pat. No. 5,678,511 shows a pet bathing device. This single piece invention has a rigid basin, a raised bottom, and straps. The bottom prevents a pet from sitting in the basin and the straps keep the pet in the basin. This invention though lacks an upper cover to contain water sprayed upon a pet.

The U.S. patent to Segura Munoz, U.S. Pat. No. 6,435,136 has a cabin for cleaning animals. This patented invention has a single cabin to enclose an animal including glass panels through which the animal sees and a water recirculation system. This invention lacks a cabin that disassembles readily and openings for an owner to touch a pet therein.

The U.S. patent to Lee, U.S. Pat. No. 6,688,257, shows a case upon a grill and drain pan for washing a pet. The case is hinged to permit insertion and removal of a pet and has matching openings through which the pet's head extends out from the case. The case though lacks protected openings with gloves for an owner to contact the pet during a wash.

The design U.S. patent to Itioz Oroz, No. D 493,259 shows a booth for washing pets. The booth has a washing portion with two fixed height sides and a third drop side. Adjacent to the washing portion is the water supply and control cabinet. The present invention lacks fixed height sides and a separate water supply as shown in the '259 patent.

The present invention overcomes the limitations of the prior art. That is, the art of the present invention, a portable apparatus for washing animals, provides a two piece container with an interior sprayer system that allows an owner gloved access to a pet within the container. Thus, prior art pet washer apparatuses do not provide for ready disassembly of a container and gloved access through the container to a pet within the apparatus.

SUMMARY OF THE INVENTION

The portable washing apparatus for animals secures animals inside a container for spraying by water. The container has a hollow box shape, a top walls, an one opening in the top, a few openings through the walls, and a door located in the wall upon one lateral end of the container through which an animal enters and exits the container. The animal is washed beginning with an inlet for delivering water inside the container, a sprayer system connected to the inlet and discharging water through three heads, an outlet that drains the inside of the container, a few straps with fixed ends to the floor of the container and free ends that secure animals inside the container. An owner washes the animal or pet by using gloves with a collar that seals to rings upon the container. Then a few discs seal the openings in the top or lid of the container, walls, and door.

The present invention can be transported to a desired location and installed. The inlet receives water from an exterior hose or an interior sink as chosen by an owner. The present invention has an integral spraying system and gloves that cooperate to allow the owner to wash all of a pet quickly and thoroughly. The gloves prevent the owner from getting drenched while allowing a complete wash of a pet. The container of the present invention serves as a cage around the pet. The present invention minimizes mess during washing and allows for a wash at the location of the owner's choosing, outdoors or indoors.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and devices for carrying out the several purposes of the present invention. It is important, therefore, that the claims be regarded as including such equivalent constructions insofar as they do not depart from the spirit and the scope of the present invention.

It is therefore an object of the present invention to provide a new and improved portable washing apparatus for animals that has all of the advantages of the prior art and none of the disadvantages.

It is another object of the present invention to provide a portable washing apparatus for animals that may be easily and efficiently manufactured and marketed.

It is still another object of the present invention to provide portable washing apparatus for animals that may be readily attached to an existing water supply.

It is still another object of the present invention to provide a portable washing apparatus for animals that may readily bathe the top and the sides of an animal therein.

It is still another object of the present invention to provide a portable washing apparatus for animals that has at least one door for an animal to enter the container.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

FIG. 1A shows a side view of the discs used to close temporarily the openings in the preferred embodiment of the present invention;

The same reference numerals refer to the same parts throughout the various figures.

DETAILED DESCRIPTION OF THE PREFERRED EMBODIMENT

Figure 1:
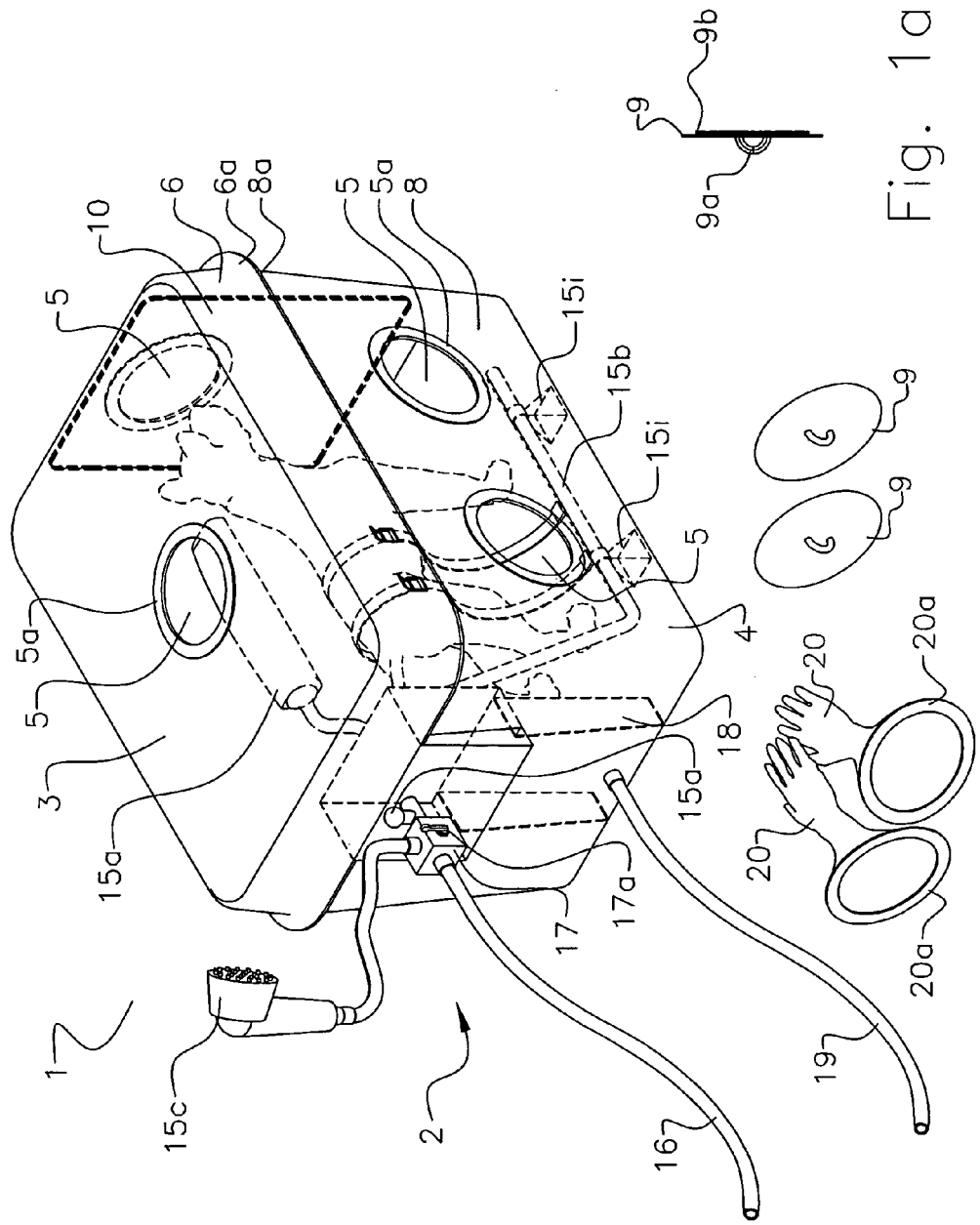
FIG. 1 shows an isometric view of the preferred embodiment of the present invention and auxiliary components.

The present invention 1 overcomes the prior art limitations by providing a container 2 with an internal sprayer system for washing animals, primarily pet dogs. The present invention receives water from a garden hose or other water source and discharges wash water through a hose like outlet. Turning to FIG. 1, an animal such as a pet dog is placed within the present invention for a bath by the pet's owner. The present invention has a container formed in two sections, an upper lid 3 upon a lower base 4. The upper lid has a generally rectangular shape in plan and trapezoidal shape upon lateral and longitudinal sections. The lid has sufficient volume, length, and width to admit the upper torso and head of a dog. The lid has a planar top and perimeter edges, generally four. The top has at least one opening 5 to allow an owner access to a pet within the present invention. From the lid, walls 6 descend downward from the perimeter edges. The walls have an edge condition 6a or seam to seal the lid to the base. Upon one wall, generally a lateral wall, the lid has a full height opening 7 for a door.

Beneath the lid, the present invention has a base 4 that contacts a supporting surface such as the ground or the floor. The base has a generally tub like shape to contain water, rectangular in plan though trapezoidal in cross section laterally and longitudinally. The base has a planar floor 4a and perimeter edges, generally four. From the floor, walls 8 extend upward from the perimeter edges. At least one of the longitudinal walls has at least two openings 5 to allow an owner access to a pet within the present invention. The openings in the walls of the base and the top of the lid are sealed temporarily with discs 9. The walls have an edge condition 8a or seam opposite the floor that seals the walls within the lid. Water released inside the present invention and by the shaking of the pet dog, remains inside the present invention. Matching the lid, upon a lateral wall, the base has a full height opening 7a for a door 10. As shown in FIG. 1, the walls of the lid 6 are shorter than the walls of the base 8. Alternatively, the walls of the lid 6 may exceed the height of the walls of the base 8.

The door 10 occupies the openings 7, 7a in both the lid and the base to allow access for a pet to enter the present invention and to retain water within the present invention. The door is located opposite the sprayer system as later described. A pet enters and exits through the same door. The door has gussets 11 upon at least two edges to retain water within the present invention. Generally the door has a hinged connection to the lid. The door has one opening 5 itself, temporarily closed with a disc. Upon removal of the disc, an owner may access the pet dog's head for washing and petting as shown. Also upon the floor, the fixed end of at least one strap 12 attaches for placement around the torso of a pet dog to secure it within the present invention, particularly the base. When washing a pet, an owner secures the pet to the straps.

Opposite the opening for the door, the base has a slot 13 that accepts a valve box 14. The valve box fits snugly into the slot to prevent loss of water from the present invention. The invention is part of the sprayer system contained within the invention to wash an animal such as a pet dog.

The sprayer system 15 begins within an inlet 16 that receives water from outside the present invention. In the preferred embodiment, the inlet is a female fitting that accepts a garden hose. The sprayer system has three sprayers in the present invention. To begin, the inlet proceeds to a diverter box 17. The diverter box has an exterior lever 17a with three operating positions. In the first position, the lever admits water through the diverter box to a third sprayer 15c. The third sprayer is a hand held head upon a hose. An owner can grasp the third sprayer and direct it through the opening in the top of the lid. The third sprayer allows an owner to provide more delicate care when spraying and rinsing the pet's head and back. The owner directs the third sprayer through the opening in the lid to rinse the pet by hand, gently.

In the second position, the lever 17a admits no water to the sprayer system. The second position ceases delivery of water to the present invention while maintaining a connection to a water source through the inlet.

In the third position, the lever admits water to the valve box 14. The valve box contains piping, elbows, and fittings to operate the first sprayer 15a and the second sprayer 15b. The first sprayer begins with a handle 15d extending outside the valve box. The handle proceeds into the valve box and connects with a generally upright stem 15e. The stem receives water from the piping in the valve box yet can rotate toward both longitudinal sides of the present invention. The stem has a head 15f aimed generally down the length of the present invention. The head has a generally linear shape with a plurality of spaced ports to release water upon a pet below the first sprayer. An owner grasps the handle and with the lever in the third position, rotates the handle left to right thus moving the first sprayer left to right over the back of the pet dog within the container. Moving the handle, an owner directs the spray of the first head upon the top of a pet. The handle allows an owner to move the first sprayer to rinse a pet within the present invention.

Figure 3:
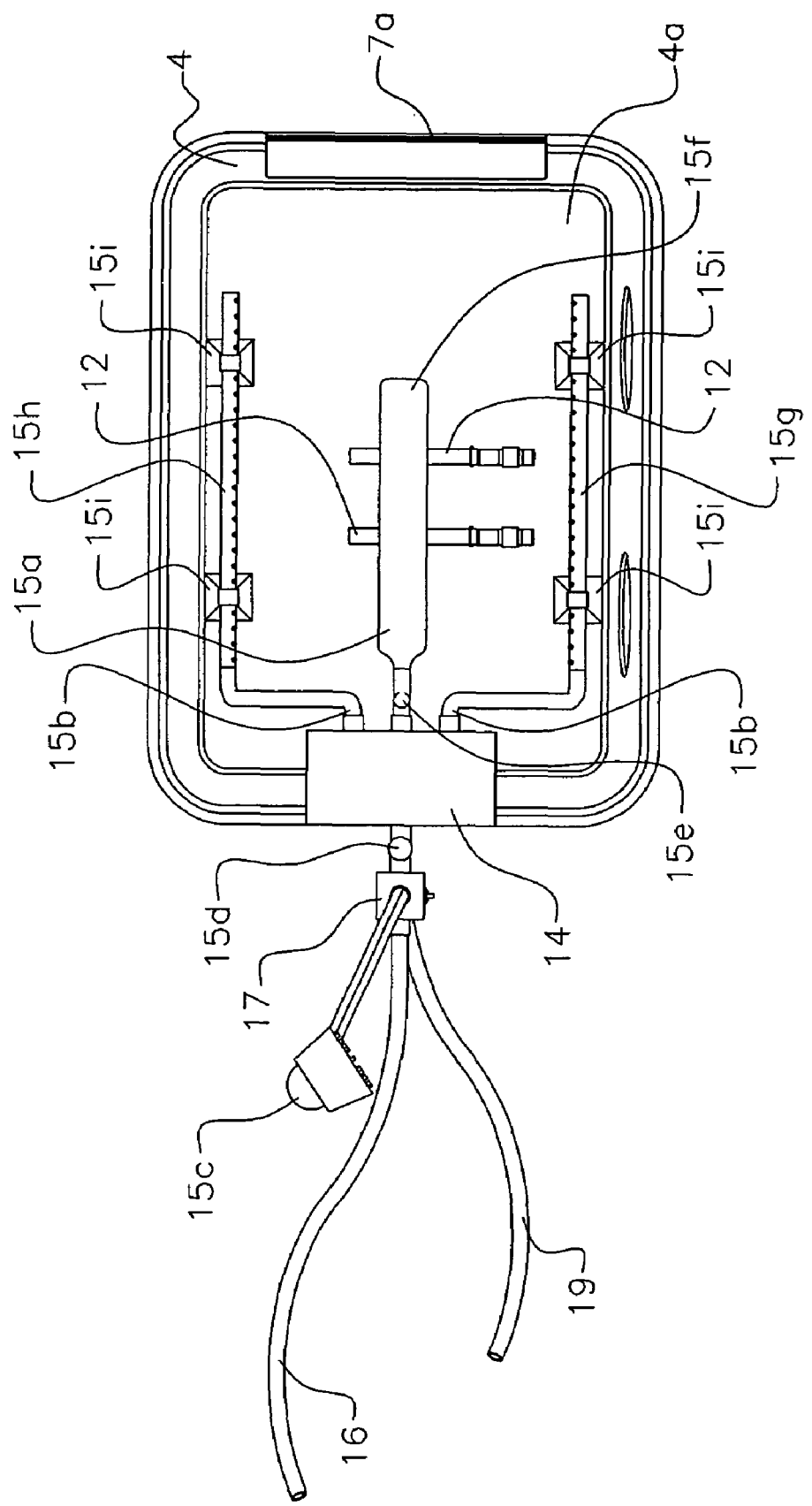
FIG. 3 has a top view of the base of the present invention and the installed sprayer system; and, FIG. 4 shows an isometric view of an alternate embodiment of the present invention with a telescoping container.

The second sprayer 15b begins with the piping of the valve box, as also shown in FIG. 3. The second sprayer has left 15g and right 15h heads connected to the valve box for delivering water onto the flanks or sides of the pet. The left and right heads have a generally linear form, tubular shape, plurality of holes in a linear pattern, and extend along the sides of the base proximate to the intersection of the floor and the longitudinal walls. The left and right heads each have at least two mounts 15i that attach to the floor of the base. The left and right heads of the second sprayer rotate upon their longitudinal axes and translate laterally towards and away from the center of the floor. The second sprayer wets the sides and the flanks of a pet inside the container.

The valve box is flush with the face and the edge of the lateral wall of the base. The valve box also seals to the lid to retain water within the container. Formed into the lateral wall of the base, two stiffeners 18 extend inwards from the lateral wall and upwards from the floor. The stiffeners support the thickness of the valve box. The spacing between the stiffeners allows water to pass between them towards at least one drain or outlet 19.

The outlet extends through the lateral wall of the base opposite the opening for the door and generally below the valve box. The outlet is generally a nipple or male fitting that accepts a garden hose or other hose for draining the wash water. Alternatively, the outlet may be located away from the stiffeners, upon a longitudinal wall, or at another location to facilitate drainage of the container.

Generally, the valve box and so connected first and second sprayers drop into the base with the valve box resting upon the stiffeners. The diverter box and inlet face outwards and the second sprayers are located upon the floor.

In an alternate embodiment, the base has a false bottom and compartments beneath to selectively drain the container. When a pet's bath ends, an owner can select at least one compartment for draining. Removable plugs at the outlet in the front and the rear of the base allow an owner to release as much water as desired. For example, larger dogs may require more water for a bath than smaller dogs.

Along with the container and the sprayer system, the present invention has at least two gloves 20 provided and wall discs 9. The gloves have fingers, generally five, joined to a sleeve. The sleeve has an opening through which an owner inserts a hand. The gloves attain a watertight connection through the openings in the walls of the base and the lid. Each of the gloves has a round collar 20a attached to the glove opposite the fingers and the collar then connects to a complementary ring 5a upon the walls of the base and the lid. Engaging a collar to a ring forms a watertight seal of a glove to the container. An owner then inserts his hands into the gloves and then washes the animal inside the container using gloved hands.

FIG. 1a shows a side view of the discs 9 that close the openings in the walls, lid, and door. Each disc has a diameter slightly larger than the diameter of an opening. Upon the exterior of a disc, a hook or handle 9a joins to the disc. Opposite the handle upon the interior surface of a disc, a flexible flange 9b joins to the disc. The flange has a beveled perimeter edge slightly wider than the diameter of the opening then narrowing proximate to the disc. In use, an owner grabs the handle to remove the disc and expose the ring. The owner then places a glove through the opening and the collar upon the ring. After using the glove, the owner removes the glove from the opening and the collar from the ring. Grasping the handle, the owner places the flange into the opening, slightly twisting the disc until the flange seats upon the interior of the container. A seated disc now prevents leakage of water through the opening.

Figure 2:
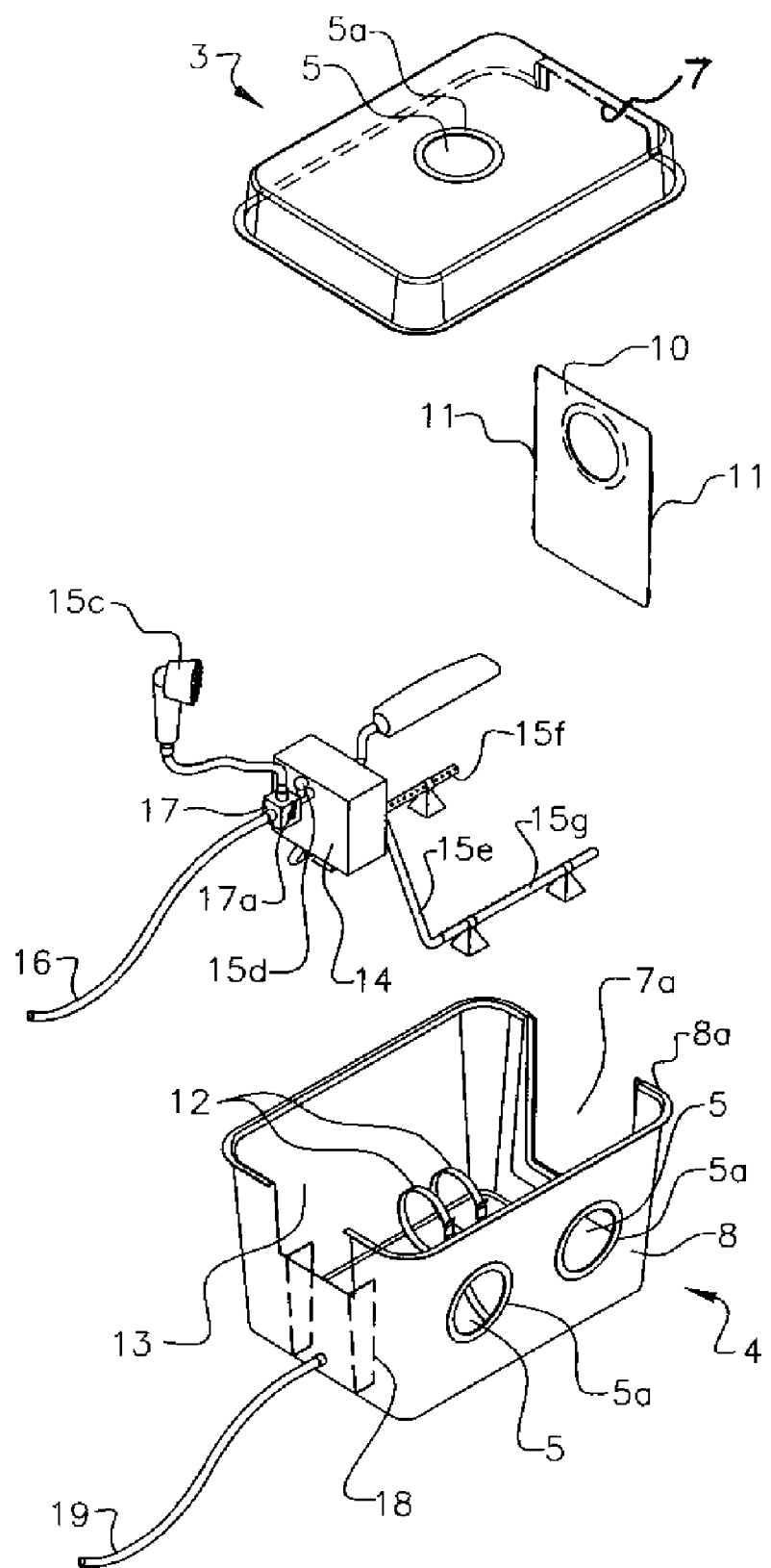
FIG. 2 describes an exploded view of the preferred embodiment of the present invention.

FIG. 2 shows the major components of the present invention. The lid provides an upper component of the container. The lid has an opening through the top sealed with a disc. Removal of the disc allows an owner to access the back and head of a pet placed within the assembled container. The lid has a rectangular opening upon one lateral side for a door that hingedly connects to the lid proximate to the top. Descending from the edges of the top of the lid, walls extend towards the interior of the assembled container. Opposite the top, the walls have an edge condition that seals the lid to the remainder of the container. The edge condition has the walls extend slightly wider than the walls of the base below. In an alternate embodiment, the edge condition is two parallel flanges in a generally inverted U shape that grasp the edges of the walls of the base between the branches of the U shape.

Opposite the lid, the base has a matching shape to the lid and walls that rise to meet the edges of the lid. Upon one lateral end, the rear, the base has a slot to receive the valve box of the sprayer system. The slot has a similar shape as the valve box and a depth the leaves the top edge of the valve box flush with the top edge of the walls of the base. The slot has two stiffeners upon each end extending inwards from the wall and connecting with the floor. The generally rectangular stiffeners support the valve box when placed upon them. The spacing of the stiffeners allows for placement of an outlet or drain centered upon the wall, beneath the slot, and proximate to the floor. Upon the floor in the interior of the base, at least one strap has a fixed end joined to the floor and a free end ready to secure a pet. The free end passes around the torso or neck of the pet then connects to the fixed end. Opposite the slot for the valve box, the base has a full height rectangular opening to receive a door. Upon at least one longitudinal wall, the base has at least one opening temporarily closed with a disc. The opening is framed with a ring attached to the wall. The ring has buttons, slots, tabs, or the like to connect with complementary fittings on the collar of a glove.

The door has a generally rectangular planar shape with flexible stiffeners upon the two upright edges and the lower edge that abuts the floor. The stiffeners retain water within the container once a pet has entered through the door. Upon the exterior of the door, a disc temporarily seals an opening.

Opposite the door, the valve box and connected sprayer system slide into the slot and the base. The second sprayer has its mounts attach to the floor so the second sprayer is generally parallel to the longitudinal walls of the base. The first sprayer connects to a handle and to the valve box. The handle extends through the valve box for an owner to turn from the outside of the container. The valve box contains the piping that supplies water to the first and second sprayers and controls that regulate volume of water to the first and second sprayers. On the outside of the valve box, a diverter valve is located in line with the inlet supplying water to the valve box and the first and second sprayers. The diverter allows the owner to select from water sent to the third sprayer, to the first and second sprayers, and no water sent to the sprayer system.

Generally the central part of the invention is the sprayer system located in the base as shown in FIG. 3. The sprayer system receives water through the inlet and regulated by the diverter. If selected by the diverter, water travels through the third sprayer for the owner to direct by hand through an opening onto a pet within the container. If selected, water travels into the valve box for distribution into the first sprayer and the second sprayer. The first sprayer is shown here in an upright position. The first sprayer is located generally above the valve box and within the lid (not shown). The first sprayer has a generally inverted L shape with the short flange of the L shape positioned above a pet within the container. The first sprayer has a plurality of holes through which water sprays upon a pet. The second sprayer has two heads mutually spaced apart and parallel. The heads of the second sprayer each have two mounts that connect to the floor generally proximate to the longitudinal walls of the base. The heads have a plurality of holes spaced along their length. The heads pivot upon the mounts as pressure changes in the piping and as movement of the piping produces. Inside of the second sprayer, at least two straps attach to the floor and are used to secure a Is pet placed within the base. Above the second sprayer, at least one longitudinal wall has at least one opening temporarily closed by a disc as previously described. Opposite the valve box and between the longitudinal walls, the base has an opening or way for a door. The door is hingedly connected to an opening in the lid and not shown in this Figure.

Figure 4:
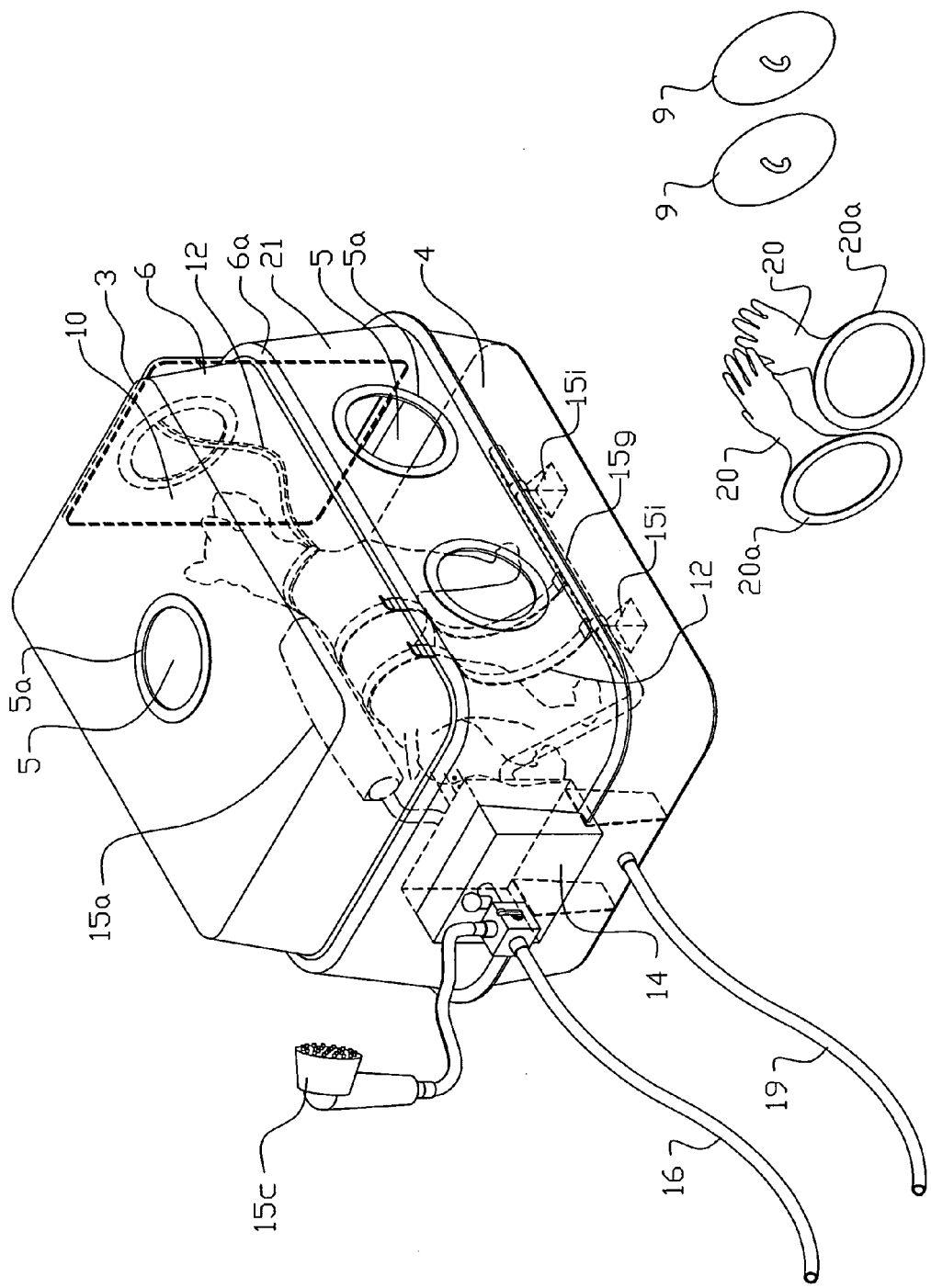

An alternate embodiment has a container formed of telescoping walls shown in FIG. 4. The alternate embodiment has a lid, at least one intermediate spacer, and a base. The lid has a rectangular shape with walls descending from the edges of a top. The top has an opening temporarily secured by a disc. A lateral wall of the lid has an opening for a door and a hinged connection to the door. Opposite the lid, the base has a rect-angular shape slightly wider and longer than the lid. The base has a floor with at least two straps attached thereto and walls extending upwards from the edges of the floor. The lateral wall where the pet enters, the front, has an opening for a door. The opposite lateral wall has a slot and stiffeners to support the valve box. The walls have an edge condition opposite the floor similar to a downward turned hook. The edge condition extends along the perimeter of the walls.

Between the walls of the base and of the lid, at least one spacer spans upwards along the perimeter of the present invention. The spacer has primarily four walls with an upward turned hook edge condition upon the bottom for engaging the walls of the base, and a downward turned hook edge condition upon the top for engaging the walls of the lid. The spacer engages the base and the lid in a watertight manner. The spacer also has at least one opening temporarily secured by a disc. Upon the lateral walls, the spacer has a slot for the valve box and an opening for a door. The valve box, sprayer system, and gloves are as previously described. Alternatively, the heights of the walls of the lid, the base, and the spacer may vary relative to one another and that shown in FIG. 4. Variation in wall height is limited by the alternate embodiment collapsing into a compact form.

In use, an owner grasps the lid of the alternate embodiment and pulls it upwards away from the base. When the lid extends upward, the walls engage the upper edges of the spacer. Then the spacer extends upwards, and the lower edges of the spacer engage the walls of the base. The owner then installs the door in the front openings of the lid, spacer, and base, and the valve box and sprayer system through the slot opposite the door in the spacer and base.

From the aforementioned description, a portable washing apparatus for animals has been described. The portable washing apparatus for animals is uniquely capable of spraying three ways upon an animal such as a pet dog secured inside a container without soaking an owner. The portable washing apparatus for animals and its various components may be manufactured from many materials, including but not limited to polymers, polyvinyl chloride, high density polyethylene, polypropylene, Plexi-glass®, fiberglass, rubber, latex, nylon, ferrous and non-ferrous metals, their alloys, and composites.

As such, those skilled in the art will appreciate that the conception, upon which this disclosure is based, may readily be utilized as a basis for the designing of other structures, methods and systems for carrying out the several purposes of the present invention. Therefore, the claims include such equivalent constructions insofar as they do not depart from the spirit and the scope of the present invention.

I claim:

1. An apparatus for washing an animal, such as a pet dog, secured within said apparatus, comprising:

a container having a hollow generally box like shape, a top and at least one wall perpendicular to said top, at least one opening in said top, and at least three openings in said wall;

a door, located in one of said openings through said wall thus an animal can enter said apparatus;

an inlet delivering water to the interior of said container, a sprayer system connected to said inlet and discharging water within said container;

an outlet in communication with the interior of said container and discharging outside said container;

at least one strap having a fixed end attached to the interior of said container and a free end, said strap adapted to secure an animal within said container;

at least two gloves, said gloves having fingers, a sleeve connecting to said fingers, and a collar upon said sleeve opposite said fingers, each of said gloves entering the interior of said container through one of said openings in said wall;

at least two discs for said openings in said wall used by said gloves but installed when said gloves are not in usage;

said container having a lid, a planar top and depending walls from the perimeter of said top, a base opposite said lid, having a planar floor and upright walls extending from the perimeter of said floor, and said walls of said base making a water tight connection to said walls of said lid;

said sprayer system having a valve box in communication with said inlet, a first sprayer extending into said apparatus opposite said inlet and adapted to discharge water within said walls of said lid generally above an animal, a second sprayer having at least one head extending into said apparatus opposite said inlet and generally below said first sprayer and adapted to discharge water within said walls of said base generally upon the side of an animal, and a third sprayer in communication with said inlet located outside said apparatus and having a head adapted to extend into any of said openings of said lid and said base; and, said base having at least one stiffener extending upwards from said floor and inwards from said wall, and generally locating beneath said valve box.

2. The apparatus of claim 1 further comprising:

said valve box having a diverter in communication with said third sprayer and said inlet, said diverter having at least two positions regulating water supplied to said third sprayer and said sprayer system.

3. The apparatus of claim 2 further comprising:

said first sprayer having a head aimed above an animal, a stem depending from said head and connecting to said valve box, and a handle exterior of said apparatus linking to said stem to turn said first sprayer leftwards and rightwards within said lid.

4. The apparatus of claim 2 further comprising:

said second sprayer having two mutually parallel spaced apart heads, each head having a plurality of holes spaced longitudinally, and at least one mount connecting said head to said floor, said mount permitting rotation of said head, and each head communicating with said valve box.

5. The apparatus of claim 4 further comprising:

said valve box directing cooperation of said first sprayer and said heads, thus turning of said handle rotates said heads upon said mounts complementary to the direction of said first sprayer.

6. An apparatus for washing an animal, such as a pet dog, secured within said apparatus, comprising:

a container having a hollow generally box like shape, a top and at least one wall perpendicular to said top, at least one opening in said top, and at least three openings in said wall;

a door, located in one of said openings through said wall thus an animal can enter said apparatus;

an inlet delivering water to the interior of said container, a sprayer system connected to said inlet and discharging water within said container;

an outlet in communication with the interior of said container and discharging outside said container;

at least one strap having a fixed end attached to the interior of said container and a free end, said strap adapted to secure an animal within said container;

at least two gloves, said gloves having fingers, a sleeve connecting to said fingers, and a collar upon said sleeve opposite said fingers, each of said gloves entering the interior of said container through one of said openings in said wall;

at least two discs for said openings in said wall used by said gloves but installed when said gloves are not in usage;

said container having a lid, a planar top and depending walls from the perimeter of said top, a base opposite said lid, having a planar floor and upright walls extending from the perimeter of said floor, and said walls of said base making a water tight connection to said walls of said lid;

said lid and said base having aligned openings in one lateral side generally opposite said inlet;

said door hingedly connecting to said lid with said aligned openings; and, said door having at least two edges, said edges having a gusset making a watertight seal when said door is coplanar with said lid and said base.

7. An apparatus for washing an animal, such as a pet dog, secured within said apparatus, comprising:

a container having a hollow generally box like shape, a top and at least one wall perpendicular to said top, at least one opening in said top, and at least three openings in said wall;

a door, located in one of said openings through said wall thus an animal can enter said apparatus;

an inlet delivering water to the interior of said container, a sprayer system connected to said inlet and discharging water within said container;

an outlet in communication with the interior of said container and discharging outside said container;

at least one strap having a fixed end attached to the interior of said container and a free end, said strap adapted to secure an animal within said container;

at least two gloves, said gloves having fingers, a sleeve connecting to said fingers, and a collar upon said sleeve opposite said fingers, each of said gloves entering the interior of said container through one of said openings in said wall;

at least two discs for said openings in said wall used by said gloves but installed when said gloves are not in usage;

said container having a lid, a planar top and depending walls from the perimeter of said top, a base opposite said lid, having a planar floor and upright walls extending from the perimeter of said floor, and said walls of said base making a water tight connection to said walls of said lid;

each of said openings in said lid and said base having a concentrically exterior mounted ring; and, each of said collars temporarily connecting to one of said rings when one of said gloves is inserted through said opening into said container.

* * * * *